June 1, 1965     N. E. BUNNELL     3,186,570
CAMPING BODY LOADING AND UNLOADING DEVICE
Filed June 24, 1963     2 Sheets-Sheet 1
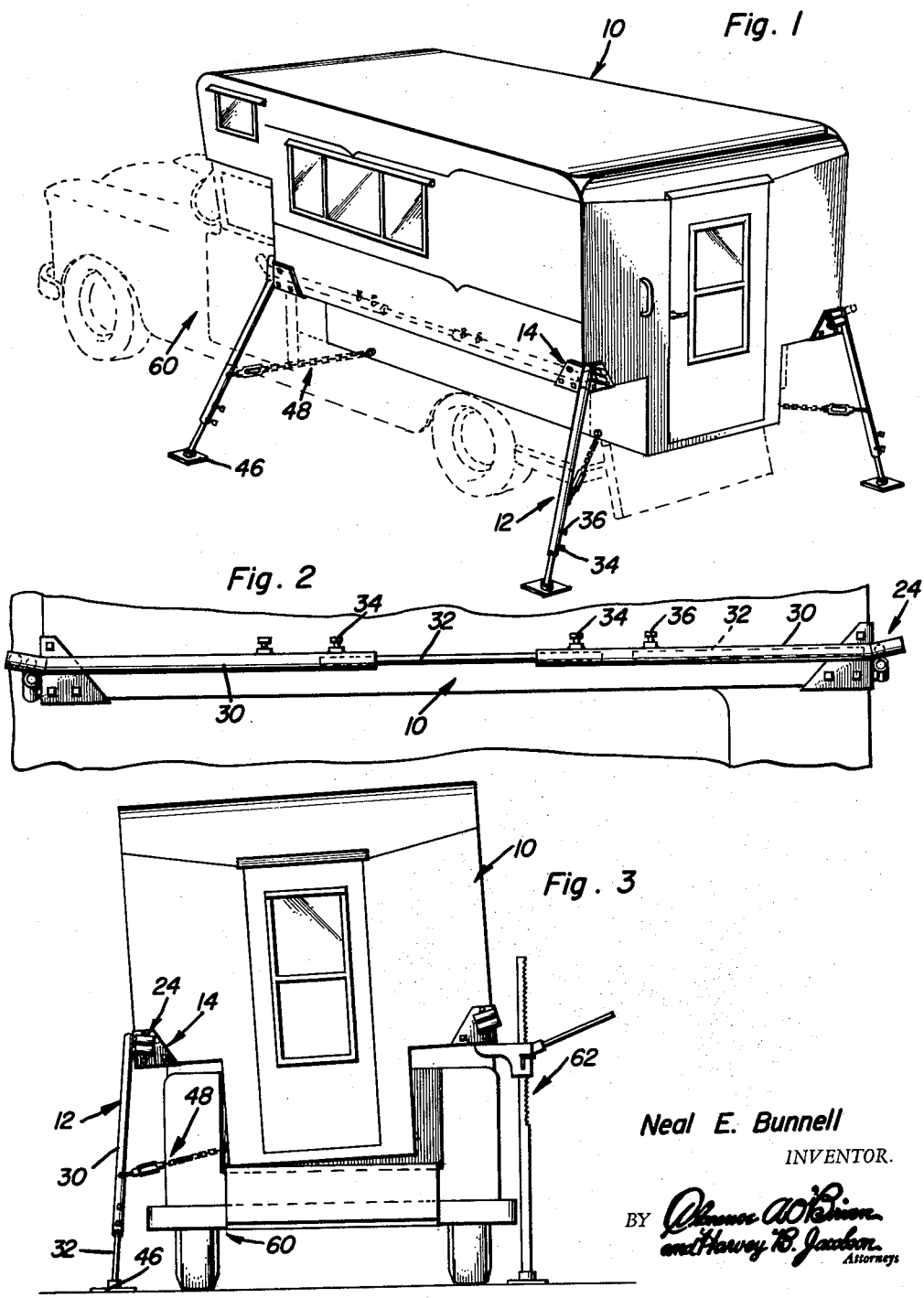
Neal E. Bunnell
INVENTOR.

June 1, 1965  N. E. BUNNELL  3,186,570
CAMPING BODY LOADING AND UNLOADING DEVICE
Filed June 24, 1963  2 Sheets-Sheet 2
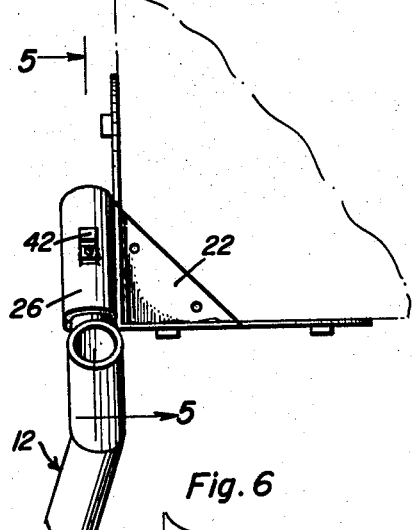
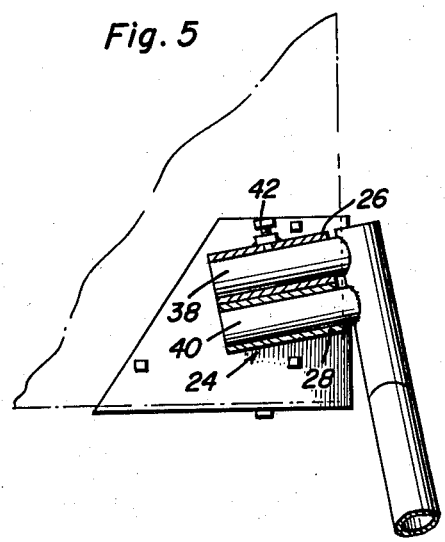
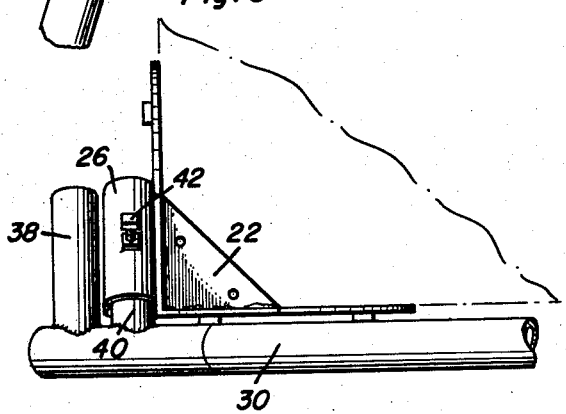
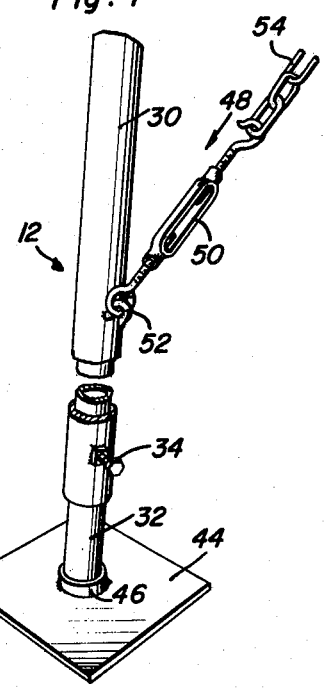
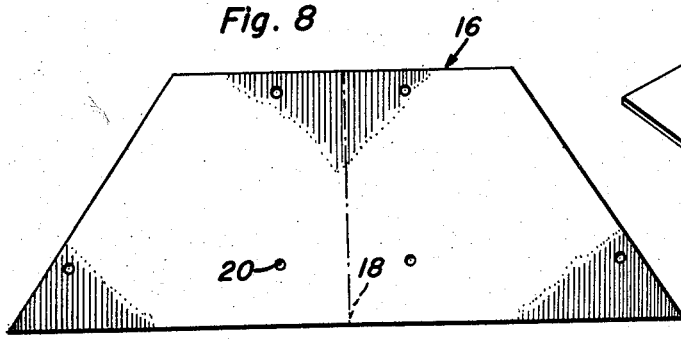
Neal E. Bunnell
INVENTOR.

United States Patent Office 3,186,570
Patented June 1, 1965

3,186,570
CAMPING BODY LOADING AND
UNLOADING DEVICE
Neal E. Bunnell, 1609 N. State St., Orem, Utah
Filed June 24, 1963, Ser. No. 289,978
7 Claims. (Cl. 214—515)

This invention primarily relates to novel means for supporting a camper above the ground surface and to a method for unloading and loading said camper from and upon the bed of a pickup truck wherein it is readily adapted to be re-positioned in a new location with a minimum of handling.

Therefore, it is an object of this invention to disclose a plurality of adjustable supporting legs for a camper body which may be easily removed and secured to the camper for supporting it upon the ground surface.

A further object of this invention resides in the further provision that said legs may be readily removed from the camper and re-positioned thereon in a stored position flush with the sides thereof and rigidly locked together during transportation and storage of the camper.

Yet another object of this invention resides in the novel mounting for the legs upon the camper body whereby the legs are angularly positioned with respect to the ground surface to more readily resist strong wind forces and to further stabilize the camper body in supported position.

A still further object of this invention resides in the novel method for loading said camper body upon the bed of a pickup truck whereby said method of loading may be easily and efficiently carried out by one person, for transportation to a new location.

Another object of this invention resides in the novel method of unloading the camper body from the pickup truck bed when the new location for the camper has been reached and wherein the camper may be quickly unloaded from the bed with a minimum of wear and tear thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the camper in supported position on the ground surface with the pickup truck which has transported it to its site shown in phantom leaving the site.

FIGURE 2 is a side view in elevation of a pair of the supporting legs shown in stored position flush with a side wall of the camper.

FIGURE 3 is a rear view in elevation of the camper and pickup truck illustrating one step in the method of either loading or unloading the camper onto or from the pickup truck bed.

FIGURE 4 is a fragmentary top plan view of one supporting bracket and leg mounted upon the camper.

FIGURE 5 is a fragmentary sectional view taken substantially along the plane indicated by the line 5—5 of FIGURE 4.

FIGURE 6 is a view similar to FIGURE 4 but showing one of the legs in stored position along the side of the camper.

FIGURE 7 is a fragmentary perspective view of one of the legs and bracing elements used to support the camper above the ground surface.

FIGURE 8 is a side view in elevation of a blank for use in constructing a mounting bracket for use upon the camper for mounting each leg at the corner thereof.

Referring now to the drawings in detail, a camper generally indicated by the numeral 10 is adapted to be supported in a stable position above the ground surface. The camper 10 is of conventional design and is adapted to be supported by a plurality of telescopically adjustable legs such as 12. Each of the legs 12 is mounted upon a corner of the camper 10 by means of a bracket such as 14. The bracket 14 is formed from a blank such as 16 which is trapezoidal in shape and is formed with a central score line 18 and a plurality of spaced apertures such as 20. Blank 16 is bent along the score lines 18 to form a pair of perpendicular legs which are mounted on a corner of the camper by aligning the score line 18 with the right angle bend between the side and end walls of the camper and disposing suitable fasteners through the apertures 20 and into the camper body to securely mount the blank 16. To complete the construction of the bracket 14, a gusset plate such as 22 is welded to the bottom edges of the bent blank 16 thereby rigidifying the mounting structure.

As will be seen from FIGURE 1, each of the legs 12 is arranged in a front pair and a rear pair. Each pair of legs converges towards the top of the camper body and are thus angularly oriented with respect to the ground surface and the camper. Due to this construction, the center of gravity of the camper body is lower than that if conventional vertical legs were used, resulting in a more stable supported position for the camper. Further, the camper is able to withstand strong wind forces and the like. In order to mount the legs 12 upon the camper body in such an angular fashion, a socket such as 24 comprising a pair of short tubular members 26 and 28 is welded or otherwise securely attached to one of the perpendicular legs of each bracket 14. More specifically the sockets 24 are mounted in opposing pairs on the rear faces of the rear brackets 14 and on the front faces of the front brackets 14. These opposing pairs of sockets converge towards the bottom of the camper body as is readily apparent from FIGURES 1 and 5.

Each of the legs 12 comprises a telescopically receiving portion 30 and a telescopically sliding portion such as 32 received within said receiving portion and clamped therein by means of a pair of setscrews such as 34 and 36 threaded in the lower end of the telescopically receiving portion 30 of each of the legs 12. Rigidly adhered normal to the top end of each of the legs 12 are a pair of stub shaft extensions 38 and 40. These extensions are slidably and removably received within the short tubes 26 and 28 respectively and locked thereto by means of a setscrew such as 42 threadedly connected to the short tube 26. It should thus be apparent that the pairs of front and rear legs will thus be angularly disposed with respect to the camper body and the ground level. A base plate 44 having a central socket 46 supports the telescopically sliding portion 32 of each of the legs 12 upon the ground surface.

To complete the supporting structure of the camper, a brace such as 48 is strung between the camper body 10 and the telescopically receiving portion 30 of each of the legs 12. Each bracing element 48 comprises a turnbuckle 50 attached at one end to a hook 52 on the portion 30 of the leg 12 and at its other end to a flexible chain such as 54 which is secured to the camper body. Therefore, once the legs have been positioned on the camper body the supporting structure may be rigidified by attaching the flexible chain 54 to the turnbuckle 50 and stretching the chain 54 to a taut position.

The camper 10 is adapted to be transported by means of a conventional pickup-type vehicle indicated in phantom by the numeral 60 in FIGURE 1 and unloaded therefrom with ease and efficiency. This invention contemplates a novel method in conjunction with the structure previously disclosed for accomplishing this. The first step in the method of unloading the camper from the vehicle body comprises placing a conventional bumper jack such as shown at 62 beneath the central portion of one of the overhanging sides of the camper body 10, as shown in FIGURE 3. A pair of support legs 12 are then placed in the sockets 24 on the opposite side of the camper body 10 and are adjusted until the telescopically sliding portions 32 can be positioned in the base plates 46. The legs are then locked in this adjusted position by tightening the setscrews 34 and 36. The jack is then raised until a portion of the bottom of the camper clears the pickup truck by about an inch. A second pair of legs 12 are then placed on the raised side of the camper and adjusted until they are positioned in the base plates 46 on this side of the camper and locked in position. The jack is then removed, as the side of the camper on which it was operating is now supported on the pair of legs 12. The jack is then re-positioned under the central portion of the other side of the camper body and this side is raised until the bottom of the camper body completely clears the pickup truck bed by about an inch to an inch and a half. The legs 12 on the second side of the camper body are then re-adjusted until they make contact with the ground surface, and are locked in position. The pickup truck can then be driven out from beneath the camper body 10, leaving the camper in supported position upon the ground surface. The bracing elements are then attached and the turnbuckles 50 tightly stretch the chains 54.

Of course, if desired, the camper may be lived in off of the pickup truck wherein it is only necessary to position the legs upon the camper body 10 and apply the bracing elements.

The camper may be just as easily loaded on the pickup truck bed as it was unloaded. The first step in this procedure is to unfasten and remove the bracing elements. The pickup truck can now be backed into position under the camper. The jack 62 is then positioned under the center of one of the sides of the camper 10 wherein said side is raised slightly to take the weight of the camper body 10 off the legs mounted on said side. After this has been done, the sliding portions 32 of the legs may be unlocked and slid into the telescopically receiving portions 30 until the legs are at their shortest length. The setscrews are then tightened to hold the legs in this position. The jack is then lowered slowly until a portion of the bottom of the camper rests on the pickup truck bed. The legs on the side that the jack has been operating are then re-lowered and re-tightened in a position where these legs once again contact the ground surface. The jack is then moved to the central portion on the opposite side of the camper wherein the above operation is repeated except that the jack is lowered all the way down until the bottom of the camper completely rests upon the pickup truck bed. The first side of the camper body which has been let down is once again raised so that the legs on that side can be removed and then the camper body is once again lowered until it rests on the pickup truck bed. This procedure is again repeated on the opposite side of the camper.

Once the camper has been loaded upon the pickup truck bed, the legs 12 are adapted to be stored flush along the sides thereof, in such a position so that they do not interfere with the truck driver's rear vision. This is accomplished as shown in FIGURES 2 and 6, wherein the lower stub shaft extension 40 is positioned in the upper short tube 26 and the leg is caused to lie flush alongside a side of the camper 10. The leg is locked in this position by tightening the setscrew 42. Prior to positioning the legs alongside the side of the camper, the telescopically sliding portion 32 of each rear leg is slid so that it is completely enclosed within the telescopically receiving portion 34 of said legs and is locked in this position by means of the top setscrew 36. The telescopically sliding portion 32 of each of the front legs is slid into the telescopically receiving portion of each of the rear legs as shown in FIGURE 1 and locked in said position by means of the lower setscrews 34 carried by each of said legs. Thus, the legs are stored in a rigid and compact fashion along the sides of the camper body.

It should now be appreciated that a camper has been disclosed which in conjunction with its supporting structure is adapted to be rapidly and efficiently loaded and unloaded on and from the bed of a pickup truck. The method disclosed for accomplishing this can easily be carried out by one person and there is less wear and tear on the truck bed. Further, due to the novel construction and positioning of the legs upon the camper, the camper has been made more stable and wind-resistant. Also, the legs may be compactly and neatly stored alongside the camper and out-of-the-way of the rear view of the pickup truck driver. The number of working parts used are at a minimum and are easily replaceable or repairable.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a portable camper adapted to be transported on the bed of a pickup-type truck or the like, a plurality of telescopically adjustable legs including a telescopically receiving and a telescopically sliding portion received within said receiving portion, mounting means for removably securing said legs to opposite corners of the camper for supporting it above the ground surface, said means mounting a first pair of legs in the same vertical plane at the front end of said camper and a second pair of legs in the same vertical plane at the rear end of said camper in such a position so that each pair of legs converges toward the top of the camper when supporting said camper whereby the camper is stabilized and able to withstand strong wind forces, and bracing means strung between each leg and the camper, said mounting means including a bracket secured to each of said corners, a socket rigidly mounted on each of said brackets, a pair of stub shaft extensions mounted at the top of each leg perpendicular thereto slidably and removably received within a preselected socket, means carried by each socket for locking said extensions in position within said sockets, the pair of sockets mounting the front and rear legs converging towards the bottom of the camper, said legs being removable from said sockets and re-positionable in a stored position flush with opposite side walls of the camper by re-inserting one of said stub shaft extensions of each leg in its socket and locking it thereto, each leg of said front pair being joined with a corresponding leg of said rear pair in said stored position by locking the telescopically sliding portion of one of said legs in both telescopically receiving portions of the front and rear leg.

2. The combination of claim 1 wherein said bracing means includes a flexible tying element secured to the camper and a turnbuckle removably secured to each leg connected to the tying element.

3. The method of loading a camper upon the bed of a pickup truck or the like for ready transportation from a position wherein it is supported above the ground surface by a plurality of telescopically adjustable legs which include a telescopically receiving and a telescopically sliding portion received within said receiving portion comprising the steps of: positioning the pickup bed beneath the camper, raising one side of the camper relative to the ground surface, adjusting the supporting legs on said one side to their shortest lengths, lowering the camper until a portion of the bottom of the camper rests on the pickup bed, re-adjusting the supporting legs on said one side of the camper until they contact the ground surface and locking said legs in re-adjusted position, repeating the procedure on the other side of the camper thereby positioning the bottom of the camper completely on the pickup bed, raising the first side of said camper once again, removing the legs attached to said side and lowering the camper back on the bed and raising the other side of the camper once again, removing the legs attached thereto and lowering the camper back on the bed, re-securing the legs flush with the sides of the camper from which they were removed while the camper is resting on the pickup bed with the telescopically receiving portions thereof in face-to-face relation, sliding the telescopically sliding portion of one of said legs secured to each side of the camper into the telescopically receiving portion of the other leg secured to said side and locking said sliding portion to each one of said receiving portions.

4. The method as defined in claim 3 including the step of removing a foot from the lower end of each leg prior to telescoping the sliding portion of each leg into the receiving portion.

5. A supporting assembly for a portable camper for supporting the camper above the ground surface and enabling the camper to be readily loaded onto and removed from a pickup truck for transport thereof, said assembly comprising a bracket adapted to be attached to each corner of the camper adjacent the bottom thereof, a supporting leg depending from each bracket with the supporting legs diverging downwardly in relation to each other, and means mounting the upper ends of said legs on said brackets, each of said legs including a telescopically receiving portion and a telescopically sliding portion received within said receiving portion for providing radial adjustment thereof, means retaining the sliding portion of each leg longitudinally adjustably received in the receiving portion of each leg, said means mounting the upper end of each leg on the bracket enabling the telescopically receiving portions of the legs to be disposed in longitudinal spaced alignment whereby the telescopically sliding portion of one of the legs is telescopically received within the aligned telescopically receiving portion of an adjacent leg, said means for retaining the telescopically sliding portions in adjusted position locking the telescopically sliding portion in bridging relation to the aligned ends of the telescopically receiving portions for retaining the telescopically receiving portions in stored position.

6. The structure as defined in claim 5 wherein said means mounting the upper end of each supporting leg to its bracket includes a pair of sockets rigidly attached to the bracket, a pair of parallel laterally extending extensions on the telescopically receiving portion of said leg for reception in the sockets to prevent pivotal movement of the legs, and means in at least one socket for retaining the extension therein and enabling the leg to be secured in stored position when the camper is being transported on a pickup truck.

7. The structure as defined in claim 6 together with an adjustable brace being attached to the telescopically receiving portion of each leg in spaced relation to the bracket and having the inner end thereof adapted to be connected with the camper in spaced relation to the bracket for stabilizing the legs when supporting the camper from the ground surface.

References Cited by the Examiner
UNITED STATES PATENTS

| 1,303,854 | 5/19 | Clark | 214—515 |
| 2,854,204 | 9/58 | Growall | 248—191 X |
| 2,958,538 | 11/60 | Norris et al. | 214—515 |
| 2,979,304 | 4/61 | Teel | 248—354 |
| 2,995,397 | 8/61 | Eames | 296—23 |
| 3,030,061 | 4/62 | Jennings | 248—354 |
| 3,074,576 | 1/63 | Peterson | 214—515 |

FOREIGN PATENTS 696,728   9/53   Great Britain.

HUGO O. SCHULZ, *Primary Examiner.*
GERALD M. FORLENZA, *Examiner.*